United States Patent [19]
van der Lely

[11] 3,962,773
[45] June 15, 1976

[54] METHODS FOR THE MANUFACTURE OF PREFABRICATED BUILDING SECTIONS OR ROOM UNITS AND FACTORIES FOR THE IMPLEMENTATION OF SUCH METHODS

[76] Inventor: Cornelis van der Lely, 7, Bruschenrain, Zug, Switzerland

[22] Filed: Sept. 19, 1973

[21] Appl. No.: 398,866

[30] Foreign Application Priority Data

Sept. 19, 1972 Netherlands ...................... 7212651

[52] U.S. Cl. ................................ 29/430; 29/200 A
[51] Int. Cl.² .................... B23P 15/00; B23P 19/04; E04G 21/14
[58] Field of Search ............. 29/430, 200 R, 200 A, 29/200 J; 52/741, 745, 747

[56] References Cited

UNITED STATES PATENTS

| | | | |
|---|---|---|---|
| 1,750,130 | 3/1930 | Romine | 29/200 A |
| 2,337,101 | 12/1943 | Harris | 29/430 |
| 2,383,225 | 8/1945 | Sorensen et al. | 29/430 |
| 2,405,544 | 8/1946 | Anjeskey | 29/430 |
| 2,779,092 | 1/1957 | Gordon | 29/430 |
| 3,225,434 | 12/1965 | Van Der Lely et al. | 29/430 |
| 3,399,445 | 9/1968 | Carroll | 29/430 |
| 3,555,763 | 1/1971 | Bloxom | 52/745 |
| 3,574,920 | 4/1971 | Stirling | 29/430 |
| 3,699,628 | 10/1972 | Gollobitz | 29/430 |

*Primary Examiner*—C. W. Lanham
*Assistant Examiner*—Dan C. Crane
*Attorney, Agent, or Firm*—Mason, Mason & Albright

[57] ABSTRACT

A production line and method for the manufacture and assembly of prefabricated box-shaped building sections, the production line having a manufacturing part for the construction of walls, floors, ceilings and roofs which are generally concrete cast in metal frame that were first dipped to render them corrosion-resistant with the concrete thereafter poured from an overhead conveyor to harden inside of and become affixed to the frame. A jig is provided for this purpose. A drying region is next located along the production line to receive the panels from the manufacturing part of the production line. Here, drying of the concrete occurs and panels are stored in storage areas in the drying region to complete the drying and hardening process. Next is an assembly station wherein panels which have been removed from manufacturing jigs are placed in assembly jigs by overhead cranes from directions transverse to the production line, the panels being generally orientated while in drying areas for the position they will occupy in the building section. In the assembly station, the panels are connected, at least in part by welding their metal frames together, to form a basic structural section which is then placed in an extension of the line comprising an assembly part wherein the section is supported by rollers and slowly moved by underlying conveyor chains while the sections are finished by the selected application of plumbing, electrical circuits, heating conduits, appliances, wall coverings, tiles, rugs, and the like, from storage facilities at the side of the production line. Displacement of the sections is prevented by upright guide rims which cooperate with the longitudinal frame beams of the floor panels of the sections.

18 Claims, 10 Drawing Figures

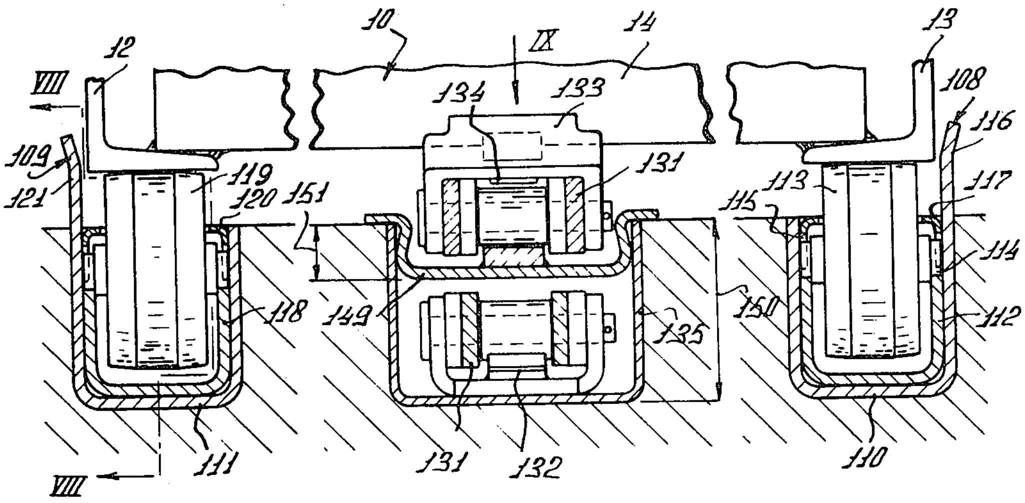
FIG. 7
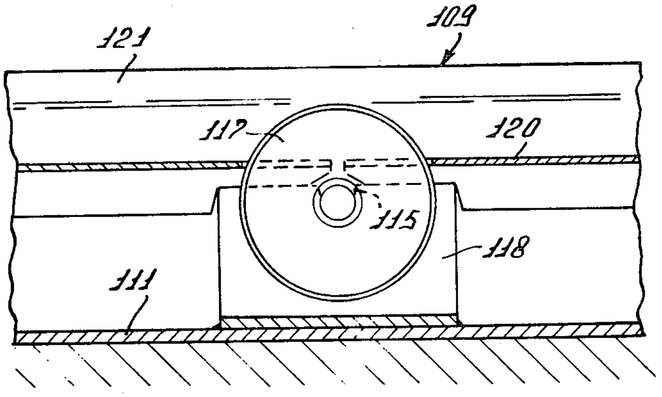
FIG. 8
FIG. 10
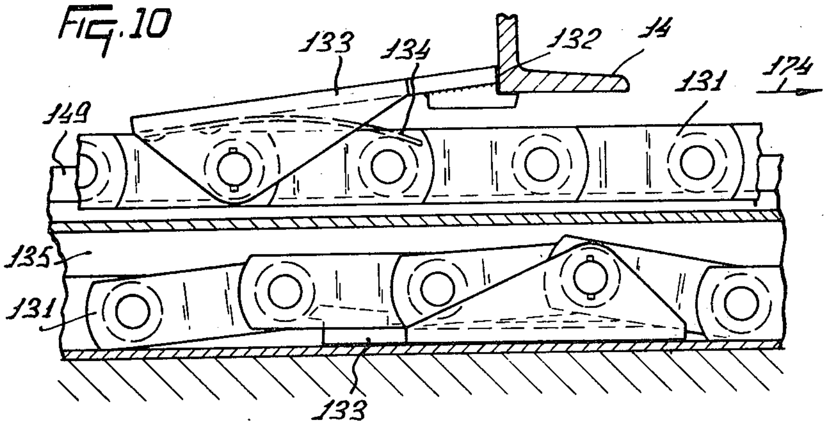

METHODS FOR THE MANUFACTURE OF PREFABRICATED BUILDING SECTIONS OR ROOM UNITS AND FACTORIES FOR THE IMPLEMENTATION OF SUCH METHODS

SUMMARY OF THE INVENTION

This invention relates to methods for the manufacture of prefabricated building section or room units and to factories for the implementation of such methods.

According to one aspect of the invention, there is provided a method for the manufacture of prefabricated building sections on a production line, the method comprising the steps of assembling prefabricated panels in at least one assembly jig, arranging and holding the panels in the jig in their correct relative positions, securing the panels to one another in those positions to form the sections which are in an at least basically completed structural condition, and moving the assembled sections out of the assembly jig for finishing operations on a further part of the production line.

For a better understanding of the invention, and to show how the same may be carried into effect, reference will now be made, by way of example, to the accompanying drawings, in which:

BRIEF DESCRIPTION OF THE DRAWINGS

FIG. 7 is a section, to an enlarged scale, taken on the line VII—VII of FIG. 6, FIG. 8 is a section taken on the line VIII—VIII of FIG. 7, FIG. 10 is an elevation as seen in the direction indicated by an arrow X in FIG. 9,

DESCRIPTION OF THE PREFERRED EMBODIMENTS

Figure 1:
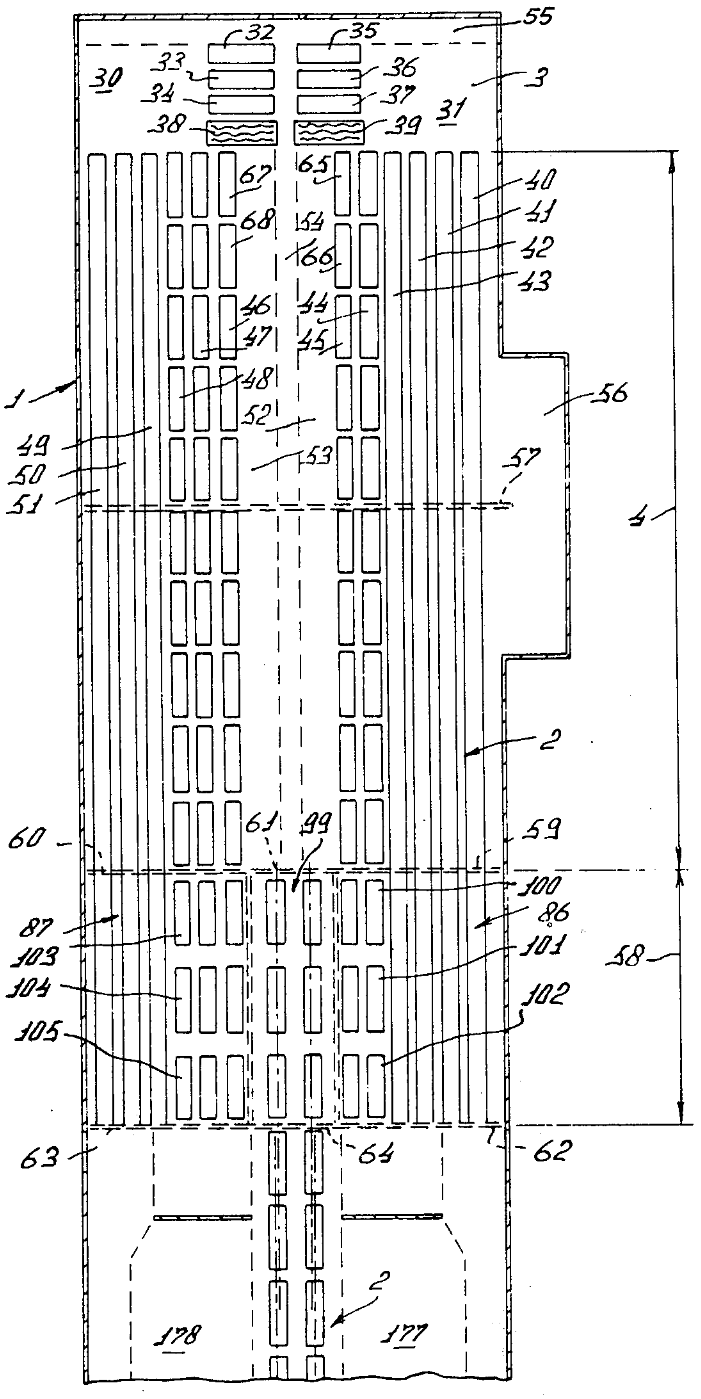
FIG. 1 is a diagrammatic plan view of a factory and shows a first part of a production line that may be employed in accordance with the invention.
Figure 2:
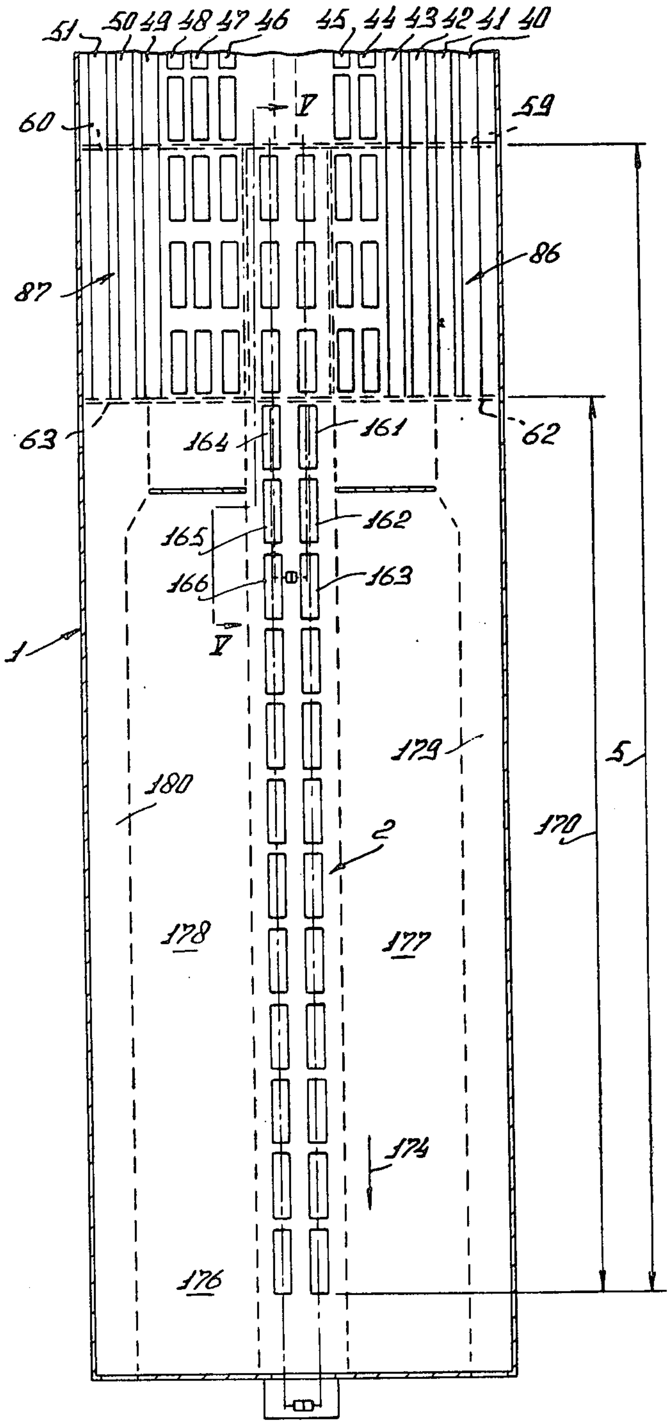
FIG. 2 is a plan view showing a further adjoining part of the production line illustrated in FIG. 1.

Referring to FIGS. 1 and 2 of the drawings, a hall 1, forming part of a factory, has arranged therein a production line 2. The production line 2 comprises a construction part 3, a manufacturing part 4 and an assembly part 5. The panels that are to form walls, floors, ceilings and so on of building sections are made in the parts 3 and 4 of the line 2 and are then assembled at the beginning of the part 5 of that line. The assembled building sections are subject to further finishing techniques as they pass towards the end of the assembly part 5 of the production line 2 so that, when they reach said end, the sections are substantially completely finished and ready for use in the construction of prefabricated buildings.

Figure 3:
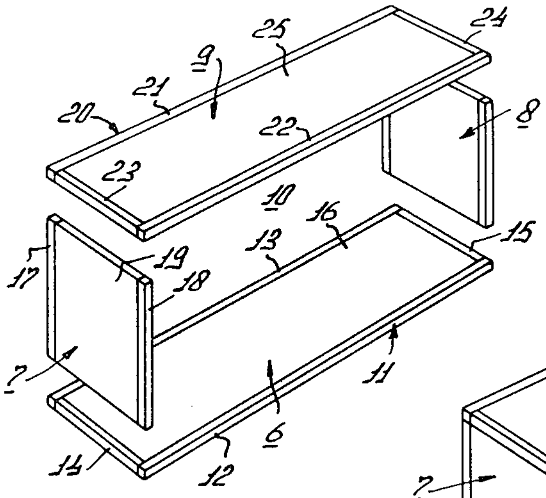
FIG. 3 is an exploded diagrammatic perspective view of a prefabricated building section that may be constructed by a method in accordance with one aspect of the invention, FIG. 4 corresponds to FIG. 3 but shows the building section in an assembled condition.
Figure 4:
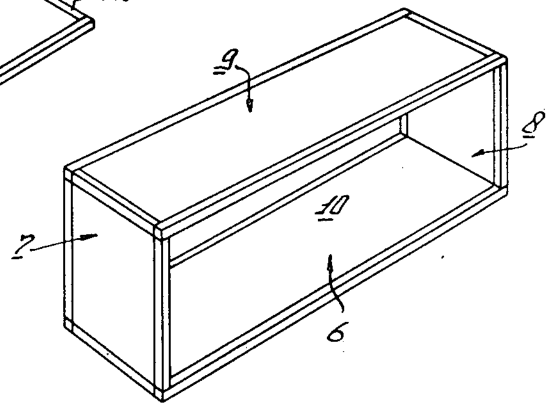

A prefabricated building section or room unit 10 (FIGS. 3 and 4 of the drawings) that may be made on the production line 2 is comprised principally by a floor panel 6, two wall panels 7 and 8 and a ceiling or roof panel 9. When the four panels 6 to 9 inclusive are assembled as shown in FIG. 4 of the drawings, the section 10 has the shape of a horizontally elongated rectangular parallelepiped with two opposite longer vertical sides missing. It is emphasized that the particular shape shown diagrammatically in FIGS. 3 and 4 of the drawings is by no means essential and that other shapes are possible depending upon the particular requirements of a building that is to be constructed. FIGS. 3 and 4 of the drawings do not show internal walls or other partitions of the section 10 but, in most cases, such internal walls or partitions will be provided during the prefabrication in the factory hall 1 together, where appropriate, with items of equipment such as kitchen equipment, sanitary ware and the like. The floor panel 6 has an oblong frame 11 of metal beams which is comprised by two longer parallel beams 12 and 13 and two shorter parallel beams 14 and 15 which beams are perpendicularly welded to each other at the four corners of the frame 11. The interior of the frame 11 is filled by at least one slab 16 that is formed wholly or principally from concrete. It is, in fact, possible to provide upper and lower slabs in the frame 11 with a spacing between them.

Each of the two wall panels 7 and 8 comprises two opposite vertically extending and substantially parallel beams 17 and 18 between which at least one slab 19 that is made principally from concrete is provided. The ceiling panel 9 comprises an oblong frame 20 formed from two longer parallel and substantially horizontal metal beams 21 and 22 and two shorter parallel and substantially horizontal metal beams 23 and 24, the beams 21 to 24 being perpendicularly welded to one another at the four corners of the frame 20. It will be apparent that the construction of the frame 20 is generally similar to that of the frame 11, the frame 20 being filled by at least one slab 25 which may be made wholly or principally from concrete or from some other material that will serve satisfactorily as the basic ceiling of a room or other space. It the panel 9 is also to serve as part of the top or roof of the building in which the section 10 is to be employed, then the frame 20 also includes an additional roofing portion which is not shown in the drawings.

The metallic frames, such as the frames 11 and 20, are made in the construction part 3 of the production line 2, and those frames are used, in the manufacturing part 4, to make the panels such as the described panels 6 and 9. The construction part 3 of the production line 2 is provided with six welding jigs 32, 33, 34, 35, 36 and 37 inclusive in which the metal beams are joined to one another to make the various frames that are required. The beams themselves are cut to the required lengths in areas 30 and 31 (FIG. 1) and the assembled frames will normally be dipped into liquids contained in two tanks 38 and 39 to render the metal corrosion-resistant or to provide the metal with a rust-proof coating or both.

The manufacturing part 4 of the production line 2 comprises two parallel paths each of which is subdivided into six side paths. As can be seen in FIG. 1 of the drawings, one of the main paths comprises six side paths 40, 41, 42, 43, 44 and 45 inclusive and the other main path comprises six side paths 46, 47, 48, 49, 50 and 51 inclusive. Each of the 12 side paths extends throughout the whole of the length of the manufacturing part 4 of the line 2 and comprises a plurality of jigs that are arranged in a row for the construction of the various panels such as the panels 6 to 9 inclusive that have been described. The four side paths 40 to 43 inclusive and the three side paths 49 to 51 inclusive all comprise jigs for the making of wall panels such as the wall panels 7 and 8. The jigs in question are constructed in such a way as to enable the beams 17 and 18 to be arranged therein so that the slabs 19 can be cast between them. The jigs are, however, preferably adjustable in such a way that internal walls and other partitions of the building sections can be made therein, such internal walls and partitions usually having dimensions which will differ from those of the panels 7 and 8. The jigs also make provision for furnishing the wall panels that are formed therein with door frames, window frames and the like. The metal beams 17 and 18 and any other required wall beams are brought to the appropriate jigs from the cutting areas 30 and 31 by way, when required, of the respective tanks 38 and 39. The side paths 44, 47 and 48 are all provided with jigs for the construction of the floor panels 6.

Before pouring the liquid concrete for the formation of the floor panels 6 or the wall panels 7 and 8 or both, metallic mesh or other concrete-reinforcing elements can be provided between the corresponding beams and can be secured to those beams where necessary. Oblong frames, such as the frames 11 and 20, can be placed on drying plates 65, 66, 67 and 68 in the side paths 45 and 46 after being dipped in the tanks 38 and 39, said plates 65 to 68 inclusive constituting temporary storage areas for the frames in which drying can take place prior to their use in forming the required panels. The side paths 45 and 46 are provided with jigs in which the ceiling panels 9 are made by casting the slabs 25 in the frames 20. The necessary frames are supplied to the side paths 45 and 46 from the welding jigs 32 and 33 and ceiling materials or roofing materials can be fixed to the slabs 25 and their frames 20, such materials being supplied from storage facilities 52 and 53 that are located at opposite sides of a strip-shaped central access region 54 that extends longitudinally throughout the length of the manufacturing part 4 of the production line 2. The facilities 52 and 53 are provided with materials along the paths 55 and 54.

The concrete that is required for making the slabs 16 and 19 (and also the slabs 25 if concrete is selected as the material for those slabs) is mixed in an area 56 at one side of the hall 1 and substantially midway along the length of the manufacturing part 4 of the production line 2. A conveyor belt 57 extends across the hall 1 from the mixing area 56 and is used to carry semi-liquid concrete, ready for pouring, to the twelve side paths of the manufacturing part 4. The semi-liquid concrete is discharged from the belt 57 into filling trays or other receptacles which are then manually or otherwise moved to the various jigs of the side paths at which the concrete is required.

Four conveying tracks are arranged above the manufacturing part 4 of the construction line 2 and can be used to carry metal beams, frames and concrete between various points in the hall 1 as may be required. The tracks actually cover the whole of the length of the construction part 3, the manufacturing part 4 and a drying region 58 of the hall 1. The drying region 58 is located beyond the manufacturing part 4 of the line 2 with regard to the direction of progress along the production line 2 during the use of that line. Each conveying track has a width which is substantially equal to the width of three neighboring side paths and comprises track rails 70 (FIG. 5) along which an overhead crane bridge 72 can travel. Each crane bridge 72 carries a mobile trolley and, since the bridges 72 are movable lengthwise along the rails 70 over the production line 2 whereas the trolleys are movable along the bridges 72 in directions substantially perpendicular to the length of the line 2, substantially any required point can be reached by crane hoists that are carried by the trolleys.

Each of the side paths 40 to 51 inclusive extends beyond the manufacturing part 4 of the line 2 into the drying area 58 and these extensions of the side paths constitute storage spaces or facilities for the various panels that have been prefabricated in the side paths. The storage spaces may be heated by, for example, hot, humid air with a view to accelerating the hardening of the concrete or the setting of any other castable materials that may be employed. It will be realized that any panels which include concrete slabs must have that concrete hardened to a sufficient extent to avoid damage before the panels concerned are removed from their jigs. A partition is formed between the manufacturing part 4 of the line 2 and the drying region 58 by three walls 59, 60 and 61. The walls 59 and 60 that extend respectively across the side paths 40 to 45 inclusive and 45 to 51 inclusive are both removable to give access to the drying region 58 from the delivery end of the manufacturing part 4 of the line 2. The wall 61 that is located between the walls 59 and 60 is, however, a fixed wall. The end of the drying space 58 that is remote from the walls 59 to 61 is closed by three further walls 62, 63 and 64 but, in this case, the walls 62 and 63 are fixed walls whereas the wall 64 that is located between them is a movable wall. It can be seen from FIG. 5 of the drawings that the drying region 58 of the factory hall 1 has a higher roof than the region of the factory hall 1 that contains the manufacturing part 4 of the line 2. Three conveyors 80, 81 and 82 are located just beneath the roof of the drying region 58 and each of them comprises track rails that extend substantially perpendicular to the length of the production line 2. The conveyors 80, 81 and 82 are located at a level above the manufacturing part 4 of the production line 2 which is substantially twice the height of the level of the track rails 70 thereabove and each of the conveyors 80, 81 and 82 comprises a corresponding crane bridge 83 having a hoist 84.

The conveying means that is afforded by the conveyors 80, 81 and 82, the crane bridges 83 and the hoists 84 enables prefabricated panels stored in drying areas 86 and 87 of the drying region 58 to be moved to the center of that region at which point an assembly station 99 is provided. The assembly station 99 comprises six assembly jigs 100, 101, 102, 103, 104 and 105 inclusive. The drying areas 86 and 87 are located at opposite sides of the assembly station 99 and panels which have been stored therein are transported to the assembly station 99 in directions which are perpendicular, or at least transverse, to the length of the production line 2. The assembly jigs 100 to 105 inclusive constitute an initial portion of the assembly part 5 of the production line 2 and, in those jigs, the prefabricated panels are arranged in their correct relative positions and are secured to one another by welding together the metal beams at the edges of the various panels. The jigs 100 to 105 inclusive cover substantially the whole of the length of the drying region 58 and are arranged in two separate rows each of which comprises three of the jigs.

Some of the jigs for the making of the floor panels 6 and the ceiling panels 9 are located in such positions that the longer edges of such panels extend substantially parallel to the length of the production line 2. Panels from other jigs that are not in the drying area 58 are brought to that drying area for temporary storage in directions that are parallel to the longest edges of those panels, storage of the panels actually taking place with the panels still disposed with their longest edges parallel to the length of the production line 2. When the temporarily stored floor panels 6 and ceiling panels 9 are required for use in the assembly jigs of the station 99, those panels are moved from the temporary storage places in the drying area 58 in directions that are substantially perpendicular, or at least transverse, to the lengths of their longest edges and to the length of the production line 2. The wall panels 7 and 8 are constructed in a horizontal disposition with the edges thereof that comprise the metal beams 17 and 18 arranged substantially parallel to the length of the production line 2. After the concrete or other castable material of the slabs 19 has set, dried and hardened to a sufficient extent, the wall panels 7 and 8 are brought from horizontal dispositions to substantially vertical dispositions that have substantially the same orientation as the panels 7 and 8 will occupy when they are used in the assembly jigs of the station 99. The panels 7 and 8 are maintained in substantially vertical dispositions and in the orientations which have just been mentioned and are brought to the drying region 58 for temporary storage in the drying areas 86 and 87 thereof in those dispositions and orientations. When eventually required for use, the wall panels 7 and 8 are brought to the assembly jigs of the station 100, still in the same substantially vertical dispositions and substantially correct angular orientations, by the crane bridges 83 and their hoists 84.

The assembly part 5 of the production line 2 comprises a roller track which affords a supporting track for the building sections during their movement along the production line 2 and which commences in the assembly station 99. The required building sections are actually assembled in the jigs of the station 99 on said supporting track. In the embodiment illustrated by way of example in the accompanying drawings, the supporting roller track is comprised by four individual tracks 106, 107, 108 and 109 (FIG. 6 of the drawings) that extend parallel to one another in spaced apart relationship. The four individual roller tracks which have just been mentioned are, in fact, arranged in two pairs 106 and 107 on one hand and 108 and 109 on the other with the two pairs parallel to, but spaced apart from, each other. Each individual track comprises a plurality or rollers that are arranged in substantially regularly spaced apart relationship from one another.

FIGS. 7 and 8 of the drawings illustrate further details of the construction and arrangement of the pair of individual roller tracks 108 and 109, it being noted that the other pair of individual roller tracks 106 and 107 is substantially identical. The track 108 comprises a metal rail 110 of channel-shaped cross-section that is recessed into the floor of the hall 1 with its limbs substantially vertically disposed. Supporting members 112 are provided at regular intervals along the interior of the rail 110 and are formed at their tops with recesses 115 which receive shafts 114 affording the axes of rotation of corresponding rollers 113. With this arrangement, each roller 113 can readily be removed from its supporting member 112, or can be reconnected thereto, merely by lifting that roller and its shaft 114 from, or dropping it back into, the corresponding recess 115. The side of the rail 110 that is outermost with respect to the whole roller track has an upright guide rim 116 that projects above the factory hall floor level and above the tops of the rollers 113 to a position where its upper region will prevent incorrect lateral displacement of the building sections such as the section 10 that is shown in FIG. 7 of the drawings. The top of the channel-shaped metal rail 110 is closed, between the rollers 113 and their supporting members 112, by cover plates 117. The track 109 is substantially symmetrically opposite in construction to the track 106 that has just been described. The track 109 comprises a metal rail 111 of channel-shaped cross-section, a plurality of regularly spaced apart supporting members 118 for corresponding rollers 119, cover plates 120 that extend between the rollers 119 and an upright guide rim 121 that is located symmetrically opposite to the guide rim 116 at the opposite side of the supporting roller track from said guide rim 116. The two individual roller tracks 108 and 109 are arranged in such a way that the lower surfaces of the longer metal beams 12 and 13 of the floor panels 6 bear on the supporting surfaces at the tops of the rollers 119 and 113 respectively (see FIG. 7 of the drawings).

Figure 9:
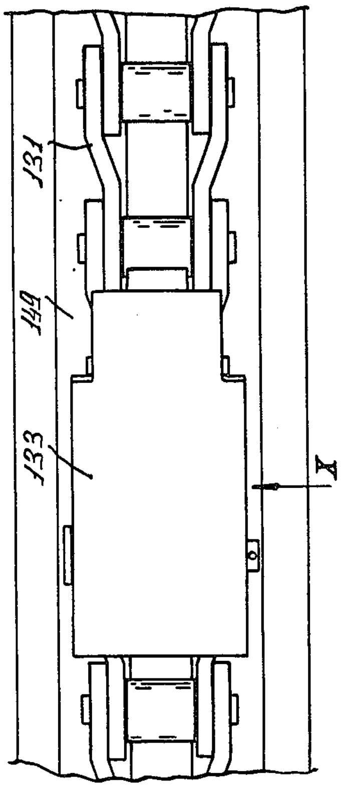
FIG. 9 is a fragmentary plan view as seen in the direction indicated by an arrow IX in FIG. 7.

The assembly part 5 of the production line 2 is provided throughout a distance 136 (FIG. 5) with a pick-up conveying mechanism in the form of conveying chains 130 and 131 that are arranged respectively between the two individual roller tracks 106 and 107 of one pair and between the two individual roller tracks 108 and 109 of the other pair. The distance 136 is twice the length of the assembly station 99 and is thus substantially twice the distance that is covered by one of the two rows of jigs 100 to 105 inclusive. The two conveying chains 130 and 131 that afford the pick-up conveying mechanism are substantially identical to one another and, accordingly, only details of the chain 131 and the parts that are associated therewith are shown in FIGS. 7, 9 and 10 of the drawings. The chain 131 is disposed in a metal-walled recess 135 of channel-shaped cross-section in the floor of the factory hall 1, said recess receiving, in an upper region thereof, a second shallower channel 149. The recess 135 has a depth 150 but the channel 149 has a depth 151 which is equal to only substantially one-quarter of the depth 150. That portion of the recess 135 which is located beneath the channel 149 receives the return run of the endless chain 131 whereas the upper operative run of that chain is located at the top of the recess 135 inside the channel 149. The chain 131 is guided through substantially 180° curves around return rollers or sprockets 138 and 139 (FIGS. 5) and 6 of the drawings) at the opposite ends of its upper and lower runs. The rollers or sprockets 138 corresponding to both the two chains 130 and 131 are secured to corresponding driving shafts operated by corresponding hydraulic motors 141 and 142 which motors incorporate corresponding accumulators 143 and 144 in order that the motors may readily be able to bring the loaded chains 130 and 131 into motion from rest.

Each of the chains 130 and 131 is provided with a number of catches or abutments 133 having stops 132 (FIG. 10) at their free ends. Each abutment 133 is mounted so as to be pivotable about the axis of a pin interconnecting two links of the corresponding chain but is subject to the action of a leaf spring 134 which tends to maintain the abutment 133 concerned in the upwardly inclined position shown in FIG. 10 of the drawings while at the same time the associated portion of the chain 130 or 131 is in the upper "operative" run of that chain. The stops 132 are shaped to fit the lower edges of, for example, the metal frame beams 14 of the floor panels 6 of the various prefabricated building sections as is shown in FIG. 10 of the drawings. In the return runs of the chains 130 and 131, during which said chains bear against the bottoms of the channel-shaped recesses 135, the leaf springs 134 are overcome so that the flat surfaces of the abutments 133 that are remote from the links of the chain concerned bear slidably against the upper surfaces of the bottoms of said recesses 135. This disposition can be seen in FIG. 10 of the drawings in respect of one abutment 133 carried by the chain 131. It will be noted from FIG. 5 of the drawings that the catches or abutments 133 are spaced apart from one another longitudinally of the chains 130 and 131 by distances 152 each of which is equal to the length in a direction 174 of one section plus the distance in the same direction between two neighboring sections, the direction 174 being the intended direction of progress of building sections under construction along the production line 2.

Figure 5:
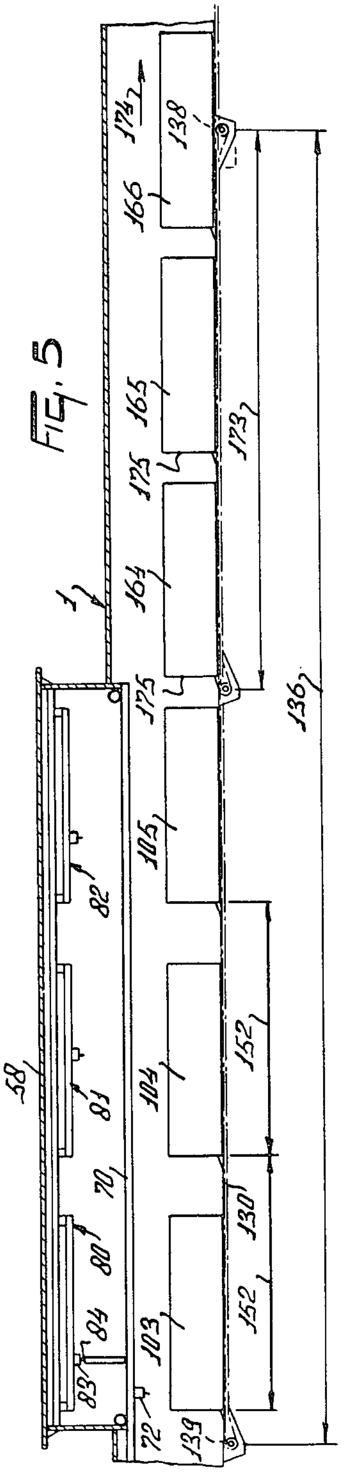
FIG. 5 is a section, to an enlarged scale, taken on line V—V of FIG. 2.
Figure 6:
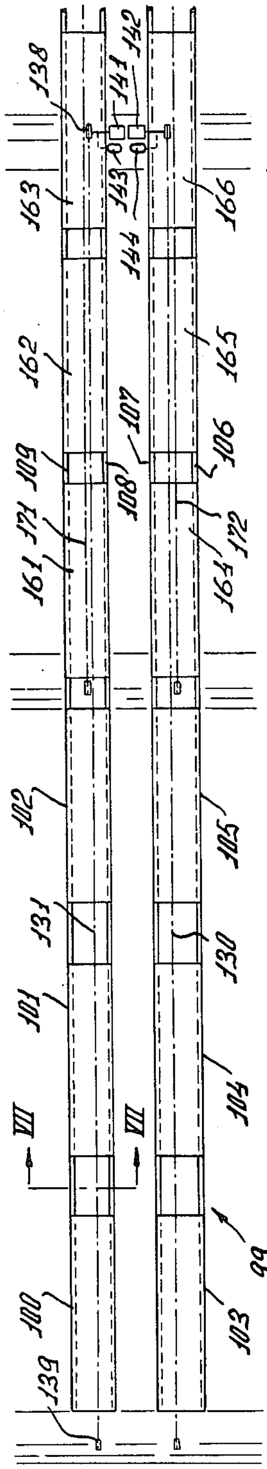
FIG. 6 is a plan view corresponding to FIG. 5.

After the assembly of three building sections in the jigs 100, 101 and 102, the chain 130 is driven to move those sections in the direction 174 through a distance equal to substantially half the distance 136. When this displacement has been completed, the sections that had been assembled in the jigs 100, 101 and 102 have reached locations that are indicated in FIG. 6 of the drawings by the references 161, 162 and 163. The hydraulic motor 142 is similarly operated to bring the building sections assembled in the jigs 103, 104 and 105 to locations that are indicated in FIGS. 5 and 6 of the drawings by the references 164, 165 and 166. When all six of the assembled building sections have reached the locations 161 to 166 inclusive, the chains 130 and 131 are stopped and the assembly of further sections from prefabricated panels can then commence in the assembly jigs of the station 99 which jigs are empty at that time.

The assembly part 5 of the production line 2 is provided throughout a length 170 (FIG. 2) thereof with a further pick-up conveying mechanism in the form of two chains 171 and 172 which chains are constructed and arranged in a substantially identical manner to the chains 130 and 131 so that a further detailed description thereof is unnecessary. The conveyor chains 171 and 172 overlap the chains 130 and 131 throughout a distance 173 (FIG. 5) and it will be seen from FIG. 6 of the drawings that the chains 171 and 172 are disposed outside the chains 130 and 131 throughout the distance 173 with respect to the longitudinal center of the whole supporting track. The chains 171 and 172 are, normally, continuously driven and will move the prefabricated building sections throughout the distance 170 in the direction 174 at a slow speed. The continuously movable transport mechanisms that are afforded by the chains 170 and 171 have catches or abutments, like those of the chains 130 and 131, that make engagement with lower edge regions of the rear ends 175 (FIG. 5) of the successive building sections with respect to the direction 174. The magnitude of the length 170 is such that, as can be seen in FIG. 2 of the drawings, two rows of building sections each comprising about 12 sections can be accommodated therein.

During the slow but steady displacement of the sections, that were basically structurally completed in the assembly station 99, have throughout distance 170, further operations performed upon them to bring them to substantially completed condition by the time that they reach the delivery or destination end 176 (FIG. 2) of the assembly part 5 of the production line 2. The sections can be individually removed from said end 176 for subsequent transport to a storage facility or, possibly, direct to a building site they are required for immediate use. The finishing operations performed during the displacement of the sections through the distance 170 include, for example, the installation of sanitary ware, cooking equipment, decorative wall finishes and the like. It is also possible to install, where required, pipework, electrical conduits, floor tiles, ceiling tiles, various electrical appliances and even carpets may be laid. The materials, applicances and equipment for this purpose are kept in supply facilities 177 and 178 provided at the opposite sides of the assembly part 5 of the production line 2 which part is located substantially centrally along the factory hall 1. The average time that is taken for any one building section to move through the distance 170 is, of course, selected so that its duration will be sufficient for all the finishing operations to be completed by the time that the delivery or destination end 176 is reached. It will be noted that the direction 174 in which the building sections are slowly conveyed through the distance 170 is parallel to the length of each section as it is disposed in the assembly part 5 of the production line 2.

The manufacturing part 4 and the assembly part 5 of the production line are parallel to one another and the two main parallel paths that are afforded by the side paths 40 to 45 and 46 to 51 respectively of the manufacturing part 4 are located at opposite sides of a rearward, with respect to the direction 174, extension of the longitudinal axis, as seen in plan view, of the assembly part 5. The drying areas 86 and 87 lie at opposite sides of the assembly station 99 in longitudinal alignment, as seen in plan view, with the various side paths of the manufacturing part 4. Fresh supplies of materials, equipment and appliances that are required in the finishing operations performed upon the building sections in the region of the assembly part 5 of the production line 2 that lies beyond the assembly station 99 are brought to the supply facilities 177 and 178 along access or conveying paths 179 and 180 that lie between the outer walls of the factory hall 1 and facilities 177 and 180 respectively throughout the distance 170. As the building sections move along the supporting track afforded by the two pairs of individual roller tracks 106 and 107 and 108 and 109, lateral displacement of those sections off the supporting track is prevented by the upright guide rims 116 and 121 that co-operate, when required, with the longer beams 12 and 13 at the opposite edges of the floor panels 6 of each successive building section. To this end, the guide rims 116 and 121 are perpendicularly spaced apart from one another by a distance which is only a little greater than the horizontal width of the building sections. The guide rims 116 and 121 co-operate to ensure that the sections bear correctly on the corresponding rollers of the supporting track and do not deviate laterally to any significant extent. As previously mentioned, the drying areas 86 and 87 of the drying region 58 serve also as and storage areas for setting, drying or hardening, or a combination thereof, of the various panels which may be facilitated by providing ducts for the supply of hot air thereto. Hot air ducts can also be arranged along the floor of that area of the factory hall 1 that accommodates the manufacturing part 4 of the production line 2, hot air being supplied, when required, through such ducts to accelerate setting, drying and hardening of concrete or other castable material of the prefabricated panels. Conveyings means may be arranged to extend parallel to the conveyors 80, 81 and 82 and may be used, for example, for feeding material to the jigs 32 to 37 inclusive. A further conveyor comprising a track having a travelling crane and hoist may be arranged lengthwise over the assembly part 5 of the production line 2 for conveying materials to and from facilities 177 and 178.

Although various steps in the methods and features of the factory have been described and illustrated in the accompanying drawings which will be set forth in the following claims as inventive steps and features, it is emphasized that the invention is not necessarily limited to only such steps or features and includes within its scope each novel and inventive step described or illustrated in the accompanying drawings and each feature of the factory described or illustrated in the accompanying drawings individually and in various combinations.

What I claim is:

1. A method for the manufacture of prefabricated building sections on a production line, the method comprising the steps of producing prefabricated panels in a manufacturing part of the production line, making such panels which are intended for use as floor panels and ceiling or roof panels in an elongated rectangular shape in said manufacturing part while being maintained in a predetermined relative orientation, storing said floor panels and ceiling or roof panels in substantially said predetermined relative orientation proximate said production line, conveying said floor panels and ceiling or roof panels while substantially in said predetermined relative orientation to a location beside an assembly station, conveying said floor panels and said ceiling or roof panels to said assembly station while maintaining them in said predetermined relative orientation, assembling said prefabricated panels in at least one assembly jib at said assembly station while arranging and holding said panels in said jig in substantially said predetermined relative orientation, securing said floor panels and said ceiling or roof panels and wall panels to one another in said jig, said floor panels and said ceiling or roof panels being substantially in said predetermined relative orientation while and immediately after being so secured to form the sections in a basically completed structural condition, and moving said basically completed structural sections out of said assembly jig for finishing operations on a further part of the production line.

2. A method for the manufacture of prefabricated building sections on a production line, the method comprising the steps of producing prefabricated panels in a manufacturing part of the production line, making such panels which are intended for use as floor panels and ceiling or roof panels in an elongated rectangular shape in said manufacturing part while being maintained in a predetermined relative orientation, storing said floor panels and ceiling or roof panels in substantially said predetermined relative orientation proximate said production line, conveying said floor panels and ceiling or roof panels while substantially in predetermined relative orientation to a location beside an assembly station in a direction parallel to the longer sides of said floor panels and said ceiling or roof panels, conveying said floor panels and said ceiling or roof panels to said assembly station while maintaining them in said predetermined relative orientation in a direction substantially perpendicular to said longer sides of said panels, assembling said prefabricated panels in at least one assembly jig at said assembly station while arranging and holding said panels in said jib in substantially said predetermined relative orientation, securing said floor panels and said ceiling or roof panels and wall panels to one another in said jig, said floor panels and said ceiling or roof panels being substantially in said predetermined relative orientation while and immediately after being so secured to form the sections in a basically completed structural condition, and moving said basically completed structural sections out of said assembly jig for finishing operations on a further part of the production line.

3. A method for the manufacture of prefabricated building sections on a production line, the method comprising the steps of producing prefabricated panels in a manufacturing part of the production line, making such panels which are intended for use as floor panels and ceiling or roofs panels in an elongated rectangular shape in said manufacturing part, the floor members including a rectangular framework of metal beams, casting a concretive material in said framework while said framework is in a horizontal position, drying and hardening said material in said framework which thereby becomes affixed to said framework, storing said floor panels and ceiling or roof panels, conveying said floor panels and ceiling or roof panels to a location beside an assembly station in a direction parallel to the longer sides of said floor panels and said ceiling or roof panels, conveying said floor panels and said ceiling or roof panels to said assembly station in a direction substantially perpendicular to said longer sides of said panels, assembling said prefabricated panels in at least one assembly jig at said assembly station while arranging and holding said panels in said jig, securing said floor panels and said ceiling or roof panels and wall panels to one another in said jig, said floor panels and said wall panels and said ceiling or roof panels being secured to form the sections in a basically completed structural condition, and moving said basically completed structural sections out of said assembly jig for finishing operations on a further part of the production line.

4. A method for the manufacture of prefabricated building sections on a production line, the method comprising the steps of producing prefabricated panels in a manufacturing part of the production line, making such panels which are intended for use as floor panels and ceiling or roof panels in an elongated rectangular shape in said manufacturing part, storing said floor panels and ceiling or roof panels, conveying said floor panels and ceiling or roof panels to a location beside an assembly station in a direction parallel to the longer sides of said floor panels and said ceiling or roof panels, conveying said floor panels and said ceiling or roof panels to said assembly station in a direction substantially perpendicular to said longer sides of said panels, assembling said prefabricated panels in at least one assembly jig at said assembly station while arranging and holding said panels in said jig, securing said floor panels and said ceiling or roof panels and wall panels to one another in said jig, said floor panels and said ceiling or roof panels being secured to form the sections in a basically completed structural condition, and moving said basically completed structural sections out of said assembly jig for finishing operations on a further part of the production line.

5. A method as claimed in claim 4, wherein the prefabricated building sections are assembled individually in said assembly jig.

6. A method as claimed in claim 4, each said section being moved from said assembly jig to said further part of the production line in a direction substantially parallel to said section's longer sides.

7. A method as claimed in claim 6, wherein said section is moved through said further part of the production line in a direction substantially parallel to said section's longer sides.

8. A method as claimed in claim 4, wherein the prefabricated panels are conveyed from at least one storage area at one side of said assembly jig to said assembly jig in a direction transverse to the length of the production line.

9. A method as claimed in claim 4, wherein the assembly station comprises at least two separate rows of assembly jigs, each said row comprising at least two assembly jigs, each row extending substantially parallel to the direction in which assembled sections are moved from said station to said further part of the production line.

10. A method as claimed in claim 4, wherein the prefabricated panels are made in a manufacturing part of the production line, the panels intended for use as floor panels and ceiling or roof panels being made in said manufacturing part in substantially the same relative orientation they will subsequently occupy in said assembly jig.

11. A method as claimed in claim 10, wherein said metal beams are welded to one another in an assembly station comprising said assembly jig to form said building sections.

12. A method as claimed in claim 4, wherein said further part of the production line comprises means for supporting at least two separate rows of building sections for movement therealong.

13. A method as claimed in claim 12, wherein means are provided for moving building sections of each said row independently of the other said row.

14. A method as claimed in claim 4, wherein materials, apparatus, appliances and the like for use in the finishing of said building section are supplied to the further part of the production line from supply facilities located at at least one side of that part.

15. A method as claimed in claim 4, wherein said building section is moved from said assembly jig to the destination end of said further part of the production line along a substantially straight path.

16. A method as claimed in claim 4, wherein the prefabricated panels are fed to an assembly station comprising said assembly jig from two opposite sides of said assembly station.

17. A method for the manufacture of prefabricated building sections which comprise the steps of manufacturing panels to comprise floor, wall and ceiling or roof members of the sections, the floor members including a rectangular framework of metal beams, said metal beams comprising two pairs of parallel beams, casting a concretive material in said framework while said framework is in a horizontal position, drying and hardening said material whereby it becomes affixed to said framework, thereafter assembling said members into a basic building section structure, placing said structure on an assembly line wherein two parallel beams comprising one said pair of said parallel beams of said framework bear directly on two spaced lines each comprising a plurality of supporting rollers, rolling said structure along said assembly line by moving means applying force directly to a rear metal beam of said framework other than said two parallel metal beams of said framework while maintaining said structure in its desired lateral orientation by guide means which extend longitudinally along each said spaced line of supporting rollers and are proximate said two parallel metal beams of said framework whereby all moving contacts occurring between said structure and said assembly line are directly via said framework.

18. A method in accordance with claim 17, wherein said members are placed in a jig for being assembled in a basic building section, at least one of said wall members including a further metal framework, welding said first mentioned framework to said further framework while said members are in said jig.

* * * * *